June 4, 1935.   R. B. MacMULLIN   2,003,378
PRODUCTION AND RECOVERY OF SODIUM CARBONATE AND AMMONIUM CHLORIDE
Filed March 24, 1932
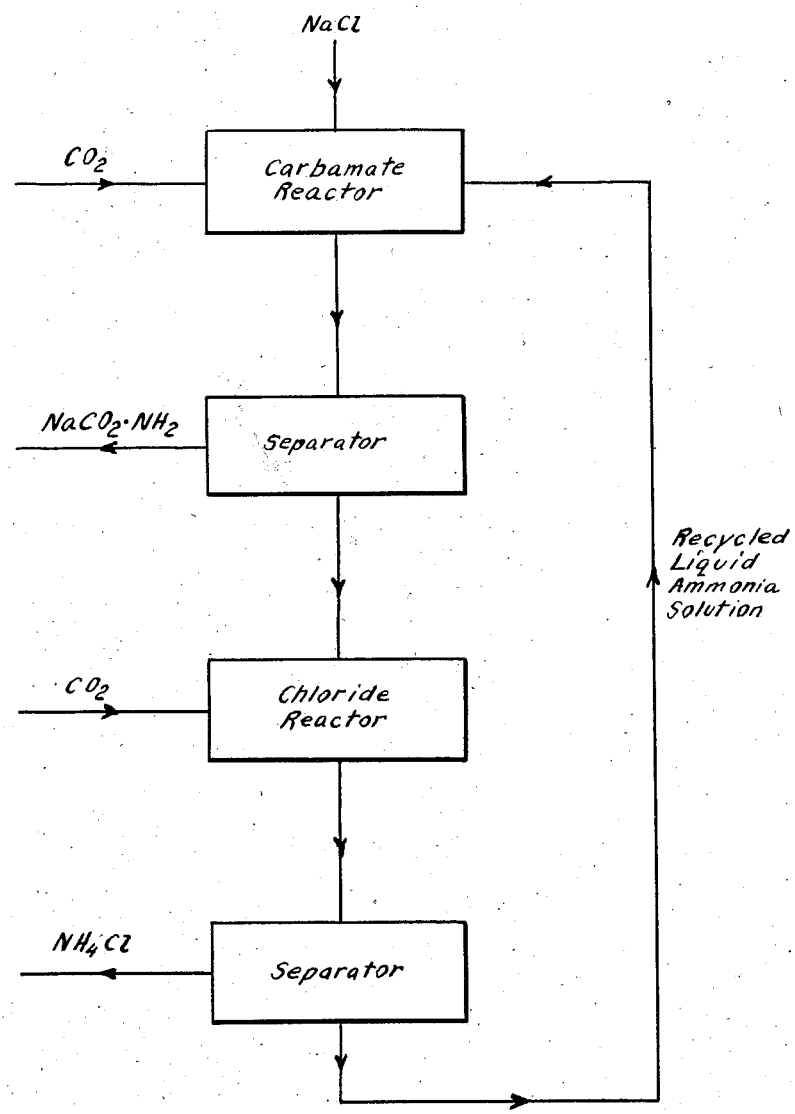
INVENTOR
Robert B. MacMullin
BY
ATTORNEYS

UNITED STATES PATENT OFFICE

2,003,378

PRODUCTION AND RECOVERY OF SODIUM CARBAMATE AND AMMONIUM CHLORIDE

Robert Burns MacMullin, Niagara Falls, N. Y., assignor to The Mathieson Alkali Works, Inc., New York, N. Y., a corporation of Virginia Application March 24, 1932, Serial No. 600,925

4 Claims. (Cl. 23—100)

This invention provides an improved method of recovering ammonium chloride from liquid ammonia solutions thereof. The invention is particularly useful in connection with the production of sodium carbamate by carbonation of sodium chloride in liquid ammonia, and the invention includes improvements in combined operations for the production of sodium carbamate and ammonium chloride.

In the production of sodium carbamate by carbonation of sodium chloride in liquid ammonia, the ammonium chloride produced in the reaction

$$NaCl + CO_2 + 2NH_3 = NaNH_2CO_2 + NH_4Cl$$

remains dissolved in the liquid ammonia while the sodium carbamate, being insoluble in the liquid ammonia, is precipitated. As the operation is continued, the concentration of ammonium chloride in the liquid ammonia approaches saturation. If saturation is exceeded, ammonium chloride is precipitated with the sodium carbamate. In ordinary practice, the operation is interrupted just before the liquid ammonia solution becomes saturated with ammonium chloride and the liquid ammonia is separated from the ammonium chloride, for re-use in the operation, by distillation. The presence of carbon dioxide interferes with this recovery operation through the formation of ammonium carbamate. It is also possible to separate a part of the ammonium chloride by cooling the liquid ammonia solution. Any cooling sufficient to effect separation of any substantial part of the ammonium chloride usually carried the temperature well below 7° C. At temperatures between about 7° C. and −18° C., ammonium chloride separates as the tri-ammonate, $NH_4Cl \cdot 3NH_3$, and below about −18° C., as the hex-ammonate, $NH_4Cl \cdot 6NH_3$. Such separation thus involves decomposition of the ammonates in order to recover this part of the ammonia and to purify the separated ammonium chloride.

I have discovered that, although carbon dioxide is almost completely insoluble in pure liquid ammonia, it is very soluble in a liquid ammonia solution saturated with respect to ammonium chloride. For example, a liquid ammonia solution saturated with respect to carbon dioxide at 30° C. contains approximately 0.18 gram of $CO_2$ per 100 grams of $NH_3$, but a liquid ammonia solution saturated with respect both to carbon dioxide and ammonium chloride at 30° C. contains approximately 27.6 grams of $CO_2$ and 102.5 grams of $NH_4Cl$ per 100 grams of $NH_3$. A liquid ammonia solution saturated with respect to ammonium chloride at 30° C., however, contains approximately 134.0 grams of $NH_4Cl$ per 100 grams of $NH_3$. I have thus found it possible to precipitate ammonium chloride from a liquid ammonia solution saturated with respect to ammonium chloride at 30° C. by merely supplying carbon dioxide to the liquid ammonia solution to recover approximately 25% of the ammonium chloride present.

According to my invention, ammonium chloride is recovered from liquid ammonia solutions approximately saturated with respect to this salt by carbonating the liquid ammonia solution and separating the ammonium chloride thereby precipitated from the solution. This carbonation and separation can be carried out at temperatures below and above 30° C. as well as at 30° C. At temperatures below 30° C. ammonium chloride is less soluble in liquid ammonia, and at higher temperatures more soluble. For example, a liquid ammonia solution saturated with respect to ammonium chloride at 15° C. contains about 127 grams of $NH_4Cl$ per 100 grams of $NH_3$ and a liquid ammonia solution saturated with ammonium chloride at 80° C. contains about 138 grams of NaCl per 100 grams of $NH_3$. Correspondingly less $CO_2$ is thus required to precipitate ammonium chloride at lower temperatures and more at higher temperatures. It is, however, advantageous to effect the separation at temperatures above about 7° C. in order to recover the ammonium chloride as such instead of as an ammonate. It will be understood that the operation is carried out under pressures appropriate to the temperatures chosen. Any necessity for distillation of the ammonia from the ammonium chloride or decomposition of ammonium chloride ammonates is thus avoided.

In the combined operation of my invention, for the production of sodium carbamate and ammonium chloride, sodium chloride is carbonated in liquid ammonia until the solution is approximately saturated with respect to ammonium chloride, precipitated sodium carbamate is separated, the solution from which sodium carbamate has been separated is further carbonated, and precipitated ammonium chloride is separated. The operation is advantageously made cyclic by returning the liquid ammonia from which ammonium chloride has been separated to the first step in which sodium chloride is carbonated in liquid ammonia. The accompanying drawing illustrates, as a flow sheet, an embodiment of the combined operation for the production of sodium carbamate and ammonium chloride.

I claim:

1. A method of producing sodium carbamate and ammonium chloride, comprising carbonating sodium chloride in liquid ammonia until the solution is approximately saturated with respect to ammonium chloride, separating precipitated sodium carbamate, further carbonating the solution from which sodium carbamate has been separated, and separating precipitated ammonium chloride.

2. A method of producing sodium carbamate and ammonium chloride, comprising supplying sodium chloride and carbon dioxide to liquid ammonia until the solution is approximately saturated with respect to ammonium chloride and separating precipitated sodium carbamate, supplying carbon dioxide to the liquid ammonia solution from which sodium carbamate has been separated and separating precipitated ammonium chloride, and returning the liquid ammonia from which ammonium chloride has been separated to the first recited step.

3. A method of recovering ammonium chloride from liquid ammonia solutions approximately saturated with respect to ammonium chloride comprising carbonating the liquid ammonia solution and separating the ammonium chloride thereby precipitated from the solution.

4. A method of recovering ammonium chloride from liquid ammonia solutions approximately saturated with respect to ammonium chloride comprising carbonating the liquid ammonia solution and separating the ammonium chloride thereby precipitated from the solution at a temperature above about 7° C.

ROBERT BURNS MacMULLIN.